United States Patent [19]

Nathanson et al.

[11] Patent Number: 4,922,253

[45] Date of Patent: May 1, 1990

[54] HIGH ATTENUATION BROADBAND HIGH SPEED RF SHUTTER AND METHOD OF MAKING SAME

[75] Inventors: Harvey C. Nathanson, Pittsburgh; Michael C. Driver, McKeesport; Regis J. Betsch, Monroeville, all of Pa.

[73] Assignee: Westinghouse Electric Corp., Pittsburgh, Pa.

[21] Appl. No.: 292,983

[22] Filed: Jan. 3, 1989

[51] Int. Cl.[5] .......................... H04B 1/38; H01P 1/10

[52] U.S. Cl. ........................................ 342/5; 200/181; 333/105; 333/262; 343/841

[58] Field of Search ............... 342/1, 5; 343/909, 872, 343/841; 200/181; 333/101, 105, 262

[56] References Cited

U.S. PATENT DOCUMENTS 3,539,705 11/1970 Nathanson et al. .
3,681,134 8/1972 Nathanson et al. .
3,796,976 3/1974 Heng et al. .
4,531,126 7/1985 Sadones .......................... 343/909 X
4,684,954 8/1987 Sureau et al. ........................ 343/909
4,814,785 3/1989 Wu ...................................... 343/909

OTHER PUBLICATIONS

Petersen, *Micromechanical Membrane Switches on Silicon*, IBM J. Res. Develop., vol. 23, No. 4, Jul. 1979, pp. 376–385.

*Primary Examiner*—Paul Gensler
*Attorney, Agent, or Firm*—G. S. Grunebach

[57] ABSTRACT

A radio frequency transmitting shutter operable at low power and high speed for use in the protection of a radar or electronic warfare array comprising a multiplicity of individual conductive beam members interconnected by electrostatic switches formed using high yield, common photolithographic methods is disclosed. Further, a photosensitive embodiment of this device which would allow activation of the shutter wherever the light falls upon the shutter during radar protection, is disclosed and claimed.

6 Claims, 6 Drawing Sheets

HIGH ATTENUATION BROADBAND HIGH SPEED RF SHUTTER AND METHOD OF MAKING SAME

BACKGROUND OF THE INVENTION

1. Field of the Invention

The present invention relates to RF shutters and more particularly to such shutters which include a multiplicity of individual intersecting conductive beam members end connected with electrostatic switches for low resistance and high open RF circuit impedance.

2. Description of the Prior Art

There are many situations where it is advantageous to be able to electrically vary the RF transparency of a physical surface. For example, an RF energy source hidden behind a variable transparency "shutter" array may be so hidden by maintaining the shutter array in the OFF position up until the moment when the energy is to be transmitted in, for example, a radar situation. The "shutter" as viewed from outside would appear as a solid metal sheet, thereby reflecting the incoming RF signals.

If the shutter is perfectly reflective for most of the cycle and perfectly transmissive for the few microseconds necessary to transmit and receive a radar signal, then the chances for discovery of the source of this RF energy would be significantly reduced.

Desirable properties of a RF shutter array would include: (1) negligible RF attenuation by the shutter array when it is in the ON state, below a few tenths of a dB; (2) very high RF attenuation in the OFF state of approximately −30 to −40 dB (with its attendant highly reflective surface); and (3) broadband microwave operation in both transmission and attenuation.

Another desirable property of a RF shutter array would be the property of inexpensive fabrication in the microelectronic format.

It is well known in the prior art to fabricate in a batch process microelectronic switches.

The U.S. Pat. No. 3,539,705 issued to H. C. Nathanson et al., on Nov. 10, 1970, entitled, "Microelectronic Conductor Configurations and Method of Making the Same" describes small air gap metal structures batch fabricated as part of a microelectronic component. These spaced metal elements can be optionally closed by compression bonding.

A second patent to H. C. Nathanson et al., issued Aug. 1, 1972, U.S. Pat. No. 3,681,134, also entitled "Microelectronic Conductor Configurations and Methods of Making The Same," is a divisional patent of U.S. Pat. No. 3,539,705. This second patent claims the method of fabrication for the device of the first patent, specifically structures and methods of making such structures involving spaced metal members in integrated circuits, such as for cantilever beams in resonant gate transistors.

A United States patent to Heng et al., issued Mar. 12, 1974, entitled "Microwave Stripline Circuits with Selectively Bondable Micro-Sized Switches for In-Situ Tuning and Impedance Matching," U.S. Pat. No. 3,796,976, describes a microstrip line divided into a multiplicity of short sections, each capacitatively coupled to its neighbor by a cantilever switch. These novel switches were of a predetermined length, (equal to fractions of a desired wavelength) and are connected together to shift the phase of energy propagating along their length thereby tuning and impedance matching the microstrip circuits.

As can be seen in the above referenced patents, it is well known in the prior art to fabricate compression bonded microelectronic conductor switches. However, the use of these switches has been limited to their obvious use as switching devices in electrical circuits.

The problem to be solved therefore is the problem of the protection and hiding of the existence of a radio frequency transmitting means during its operation without interference with the transmitting means effective operation while it is being protected.

SUMMARY OF THE INVENTION

This invention provides a high attenuation, broadband, high speed RF shutter array operable to protect a RF transmitting means in close tactical and combat environments.

The shutter array comprises a multiplicity of intersecting conductive beam members end connected by easily fabricated electrostatic switches having a predetermined spacing between each electrostatic switch in a conformal application. Specifically, the high attenuation broadband, high speed radio frequency shutter array comprises a multiplicity of electrostatic switches where these switches are operable to be actuated by a predetermined voltage into a closed position. These electrostatic switches are spaced upon the surface of a support means at a predetermined distance. The period of spacing between the switches along the conductive beam members is less than the shortest wavelength of a radio frequency signal emitted by a radar, when the radar is positioned behind the high speed radio frequency shutter.

The shutter array means would be operable, maintained and power driven without detriment to the RF transmitting system. This invention also encompasses a method of radar protection utilizing the high speed shutter.

BRIEF DESCRIPTION OF THE DRAWINGS

For a better understanding of the invention reference may be had to the preferred embodiment exemplary of the invention shown in the accompanying drawings in which.

DESCRIPTION OF THE PREFERRED EMBODIMENT

Figure 1:
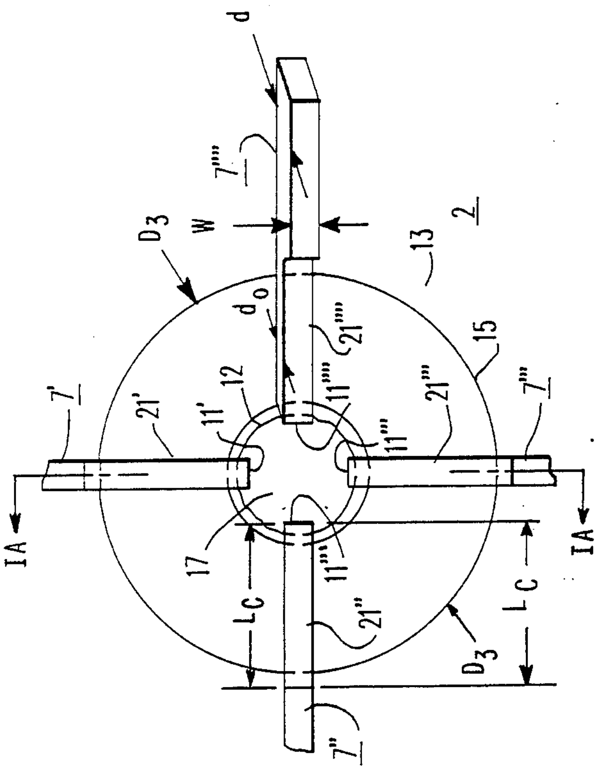
FIG. 1 is a top plan view of an individual electrostatic switch having four conductive beam members, constructed in accordance with this invention.

FIG. 1 shows a plan view of an individual electrostatic switch 2. As can be seen in this plan view, four conductive beam members, 7′, 7″, 7‴ and 7⁗ having cantilevered switches 21′, 21″, 21‴ and 21⁗ in a photolithographically displaced region 15. Tips 11′, 11″, 11‴ and 11⁗ of the conductive beam members 7′, 7″, 7‴ and 7⁗ respectively are positioned above the contact region 17. The length $L_c$, of the cantilever switch 21⁗ including the tip 11⁗, and the depth, d, of the conductive beam member 7⁗ are also shown.

One of the most important characteristics of an electrostatic switch 2, as shown in FIG. 1 is its low metal-to-metal resistance. If the electrostatic switch 2 were replaced by, for example, a PIN diode, an ON resistance of 0.5 ohm (Ω) would require a holding current of approximately $I=KT/R$, or about 0.25 amps per switch. In this embodiment there are four/$L_c^2$ per node or approximately 6400 switches per square centimeter. Obviously, a holding current of 250 milliampere/switch would be prohibitive due to extreme power consumption. It can be seen in FIG. 1 that the depth of the strip conductive beam members 7′, 7″, 7‴ and 7⁗ is slightly decreased over the photolithographically eradicated area 15 where they have a depth of $d_O$, as opposed to the depth d for the overall conductor.

Figure 1A:
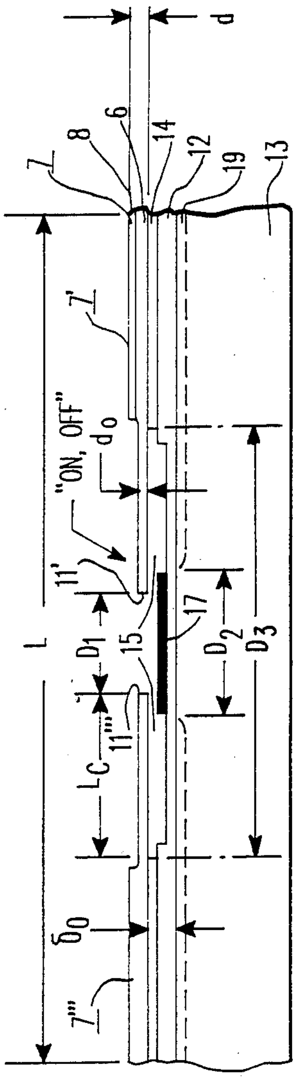
FIG. 1A is a cross-sectional view taken along line IA—IA of the individual electrostatic switch as shown in FIG. 1.

FIG. 1A is a cross-sectional view taken along line IA—IA of two conductive beam members 7‴ and 7′ of the individual electrostatic switch 2 which is more fully described in FIG. 1. In this view taken along cross-section IA—IA, it is clearly shown that a silicon substrate 13 has layered upon it, an oxide layer 12. A high conductivity region 19 is embedded beneath the oxide layer 12 within the silicon substrate 13. A polysilicon support layer 14 is layered upon the oxide layer 12. The conductive beam members 7′ and 7‴ which over hang the photolithographically inscribed region 15 are comprised of two layers; a layer of titanium-gold (Ti-Au) 6, has a layer of gold (Au) 8 a top it. The bevelled conductive beam members 7′ and 7‴ which are cut on an angle extend fully over the inscribed region 15, tips 11′ and 11″ respectively extending over the gold (Au) contact region 17.

For the electrostatic switch 2 as shown in FIGS. 1 and 1A, the values of an exemplary switch, 2 for example in the 2 to 18 GHz shutter are:

$D_1 = 30\mu$ $D_2 = 40\mu$ $D_3 = 100\mu$ $L = 250\mu$ $L_c = 35\mu$ $d_o = .74\mu\ (d = 5\mu)$ $\delta_o = 2.5\mu$ $W = 10\mu$ As shown in FIG. 1A, one suggested embodiment for the device has L equaling 250 microns (μ), d equal to 5 microns (μ), and W equal to approximately 10 microns (μ). Note that with a L where, L is the surface distance between any two conductive beam members, of 250 microns (μ) or conductive beam member, the shutter spacing would be approximately 60 times smaller than a wavelength at 20 GHz which is approximately 1.5 cm. Thus, when the shutter screen is in the "OFF" position we would expect that it would be highly attenuating to the 20 GHz radiation providing that the shutter resistance would be appropriately low. We note that the resistance of a 5 micron (μ) thick, by 10 micron (μ) wide, 250 micron (μ)long segment of gold (Au) would be $R=(RHO\times L)/wxt)\text{-}(2e^{-8}\times 250e^{-6})/(1e^{-6}\times\text{-}10e^{-6})$, where RHO is the coefficient of resistivity, L is the length, W is the width, and t is the thickness of the material or approximately one half of an ohm (0.5 Ω). Further, in FIG. 1A the conductive beam members 7′, 7″, 7‴ and 7⁗ rest upon an insulator surface from which a circular region has been photolithographically removed so that these beam tips 11′, 11″, 11‴, 11⁗ respectively freely extend in space over a circular contact region 17 positioned below the insulator surface. All of the metal conductive beam members 7′–7⁗ are connected electrically together. These conductive beam members comprise high conductivity layers 6 and 8. Beneath the high conductivity layers 6 and 8 are two insulator layers 12 and 14.

Providing that the multiplicity of electrostatic switches make a reproducible contact resistance on the order of 0.5 ohm (Ω) or lower, the reflectivity of the OFF shutter would not be significantly degraded from that of a highly attenuating 250 micron (μ) pitch continuous metallic shutter.

Figure 2:
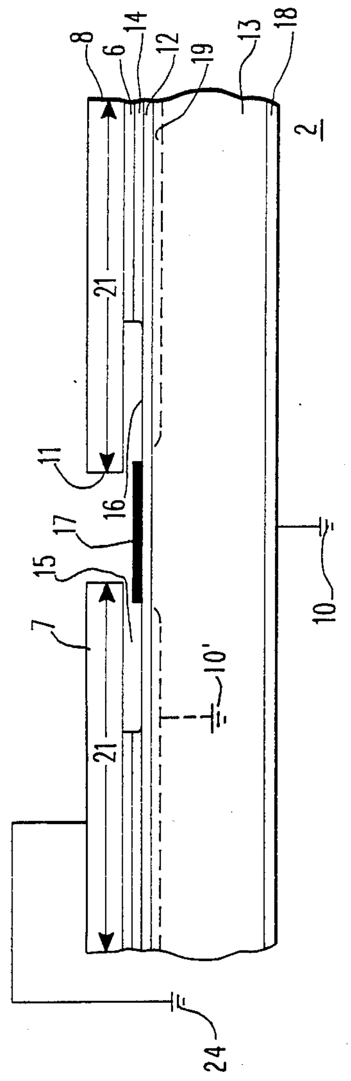
FIG. 2 is a schematic representation shown in cross-section of an embodiment of the optically driven individual electrostatic switch.

In FIG. 2 is a cross section schematic representation of the electrostatic switch 2. In this embodiment we have undercut the polysilicon layer 14 under each of the individual conductive beam members 7. A layer of insulating oxide 12 prevents short circuiting over the highly resistive regions 19 and polysilicon 14, supporting the individual conductive beam members 7 with tips 11 overhanging the photolithographically etched region 15 on the surface of the substrate 13 wherein the tips 11 overhang the gold (Au) contact 17 supported by the oxide 12. In the embodiment as shown in FIG. 2, a voltage source 24 is shown directly interconnected to the conductive beam member 7 wherein the voltage 24 is grounded, by ground means 10′ and the highly conductive region 19 is grounded as is the overall back plated region which again is connected to ground 10.

Figure 5:
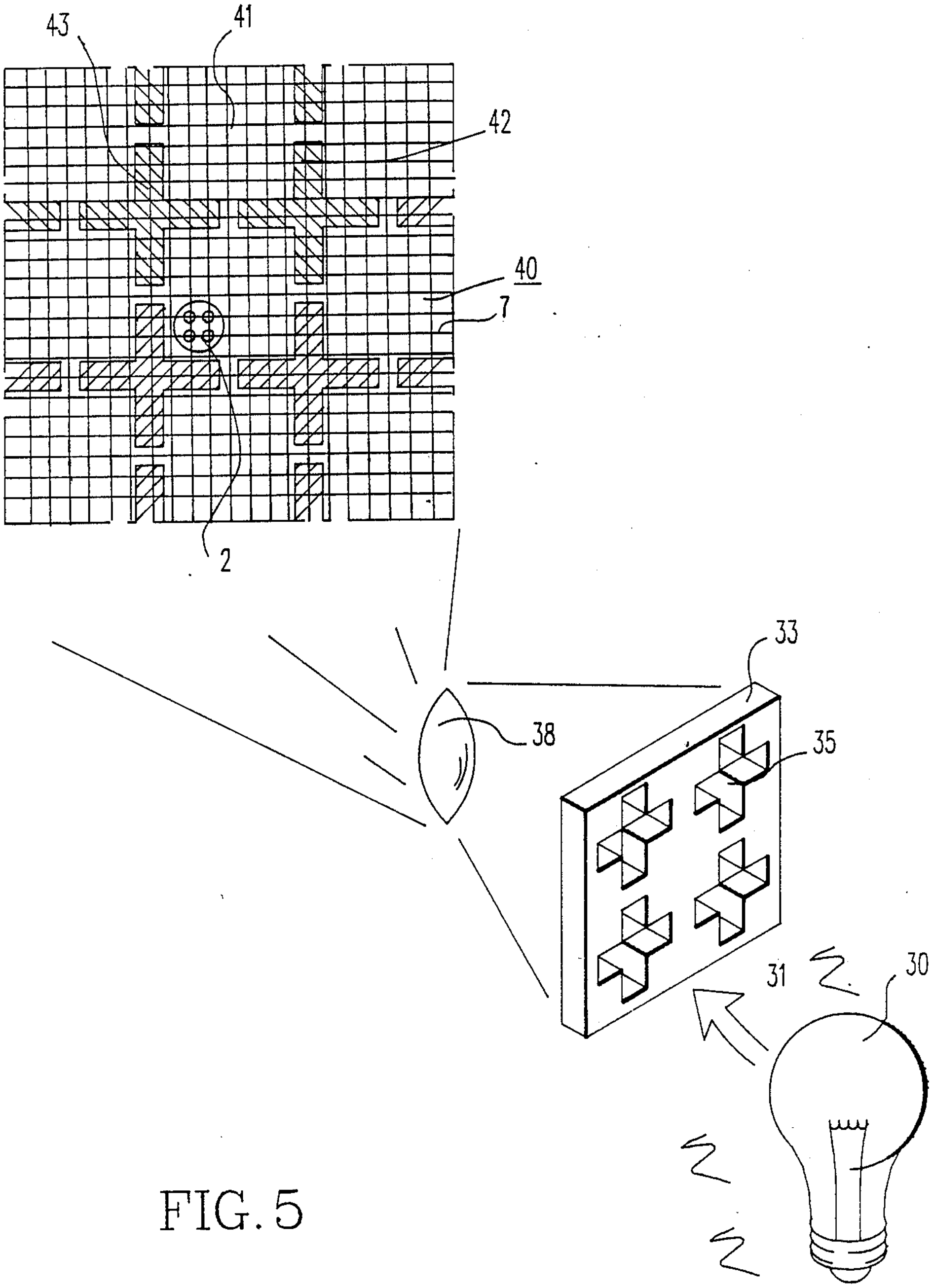
FIG. 5 is a schematic representation of an alternative embodiment of this invention in a photo driven application.

As also shown in FIG. 2, the addition of a bottom electrode 10 and the use of a substrate of RF transparent photoconductive material makes it possible to project patterns of light onto the the back or front of the shutter as more clearly seen in FIG. 5 to effect the closure of the multiplicity of individual switches wherever the light falls upon them. Specifically if the photoconductor is made conducting by illumination, the voltage on layer 19 is shorted to the grounded layer 18, disabling the switching action leaving the switches open. Thus, a photo-addressable spatially-selective RF shutter could be produced. Such a device can also be used as a Fourier Transform plane at radar frequencies. Therefore, the structure shown in FIG. 2 would be yet another embodiment device 2. In FIG. 2, if we fabricate an optically driven array, then the silicon (Si) layer, 13 becomes a photoconductor capable of photoconductivity. Further, the electrode 18 would be of a phototransmissive material in the visible light range, comprised of, for example indium-tin oxide $InSnO_3$. The driving voltage 24 for the photoconductive application would be connected to the high conductivity layer 19. It is assumed for reason of these discussions that in an array all high conductivity layers 19 of the individual switches would be electrically connected. In either the photoconductive or non-photoconductive application the grounds of all the switches would be electrically interconnected as well.

Figure 4:
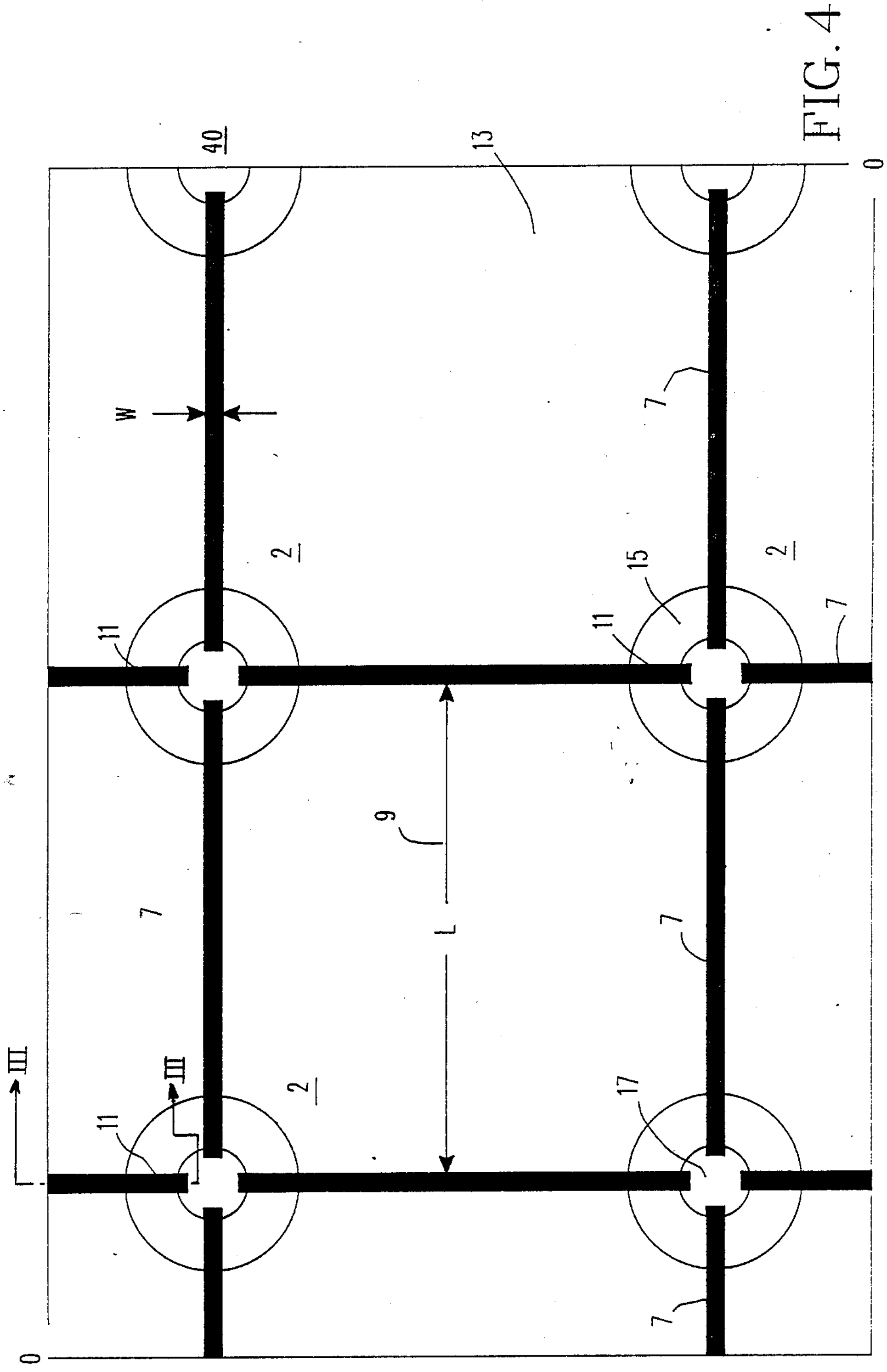
FIG. 4 is a plan view of the preferred embodiment of the shutter array comprising a multiplicity of individual electrostatic switches.

FIG. 4 is a plan view of a shutter array 40 comprising a multiplicity of individual electrostatic switches 2. These switches 2 are made up of at least four individual vertical or horizontal conductive beam members 7 formed upon an insulation layer 13 having a high conductivity layer 19' deposited within it. The distance between the conductive beam members 7 upon the surface of the shutter, is length, L. The width of the conductive beam members 7, shown as width W, is also a determining factor in the efficiency and function of these devices.

As further shown in FIG. 4 an array of horizontal and vertical electrically disconnected conductive members 7 is positioned on a square grid wherein the spacing or distance, L is much less than the shortest wavelength of the RF energy under consideration. The tips, 11 of the conductive beam members 7 of normal length L can be electrically connected by means of a plurality of electrostatic switch assemblies 2 located at each junction of the four tips 11 such as illustrated in FIG. 1. Also, as shown in FIG. 1, the metal conductive beam members 7 rest upon an insulator surface 13 from which a circular region 15 has been photolithographically removed so that these tips 11 are freely extended in space over a circular contact region 17, a distance below the insulator surface 13. All of the metal conductive beam members 7, for example, are connected electrically together through a highly conducting layer of polysilicon 14 layered above top insulation layer 13.

In FIG. 4, the shutter array 40, with its multiplicity of independent electrostatic switches 2 are all closed simultaneously by the application of a voltage on the order of, as previously described, the voltage pull in or, VPI between the high resistivity layer 19 and the device substrate insulation layer 13. In the closed position, the multiplicity of switches 2 pulled in by the electrostatic attraction between the individual horizontal or vertical conductive beam members 7 and the surface of the substrate layer 13 short the tips 11 together against the contact 17 in a low impedance manner. This electrical shorting forms a conductive shutter 40 of pitch length L, where L is much less than the RF wavelength c/f, and where C is the speed of light and F is the frequency under consideration. If the impedance of this shutter array 40 is sufficiently low, RF energy will be markedly attenuated in the transmission phase since the RF, E and H, vectors cannot penetrate the tight spacing of the multiplicity of switches comprising the screen. In contrast, when the shutter 40 is in the disconnected or OFF position it provides tip-to-contact open switch capacitance and the switches are independent of each other. Again, each segment of the array would be small relative to the RF wave length and each segment would follow the localized E and H field so that the RF wave would suffer little or no attenuation as it passed through the open circuit screen. If the periodicity or, L is a small fraction of the wavelength at the highest frequency of interest, the shutter array 40 should have both broadband transmission and attenuation characteristics up to a frequency such that the wavelength that comes in appreciable fraction of the length L.

Further, the shutter array 40 as shown in FIG. 4 would require the use of a multiplicity of electrostatic switches 2 operable as low impedance shorts at negligible switching energy because a very low capacitance would allow the ability of the electrostatic switch 2 to switch between the two states of open or ON and OFF in microseconds. Note that a distance or spacing, L of approximately 250 microns, i.e., the spacing between the multiplicity of switches along the conductive beam members being 250 microns apart, 6400 electrostatic switches 2 per square centimeter of a shutter 40 would be required. The ability to produce this many switches having a high yield by photolithographic techniques all operable to perform simultaneously in a reliable manner further constitutes the novelty of this invention.

Figure 3:
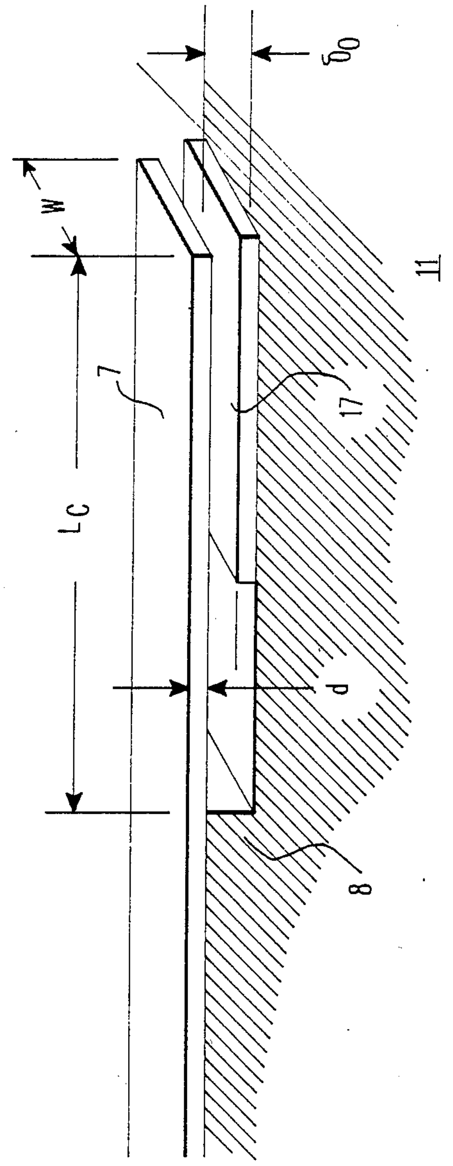
FIG. 3 is an isometric, cross-sectional view taken along line III—III in FIG. 4 of the tip of one of the conductive beam members forming one segment of the individual electrostatic switches.

FIG. 3 is a cross-sectional view taken along line III—III as shown in FIG. 4 of the tips 11 as found on the horizontal and vertical conductive beam members 7. As shown in FIGS. 1 and 1A, the tips 11 overhang the gold contact 17. The length of this tip 11, which will function as a cantilevered switch, may be referred to as $L_c$, or the cantilever switch length. The "d", is the depth of the cantilever switch length $L_c$. And, the distance between the gold contact 17, and the cantilever switch tip 7, is referred to as $\delta_0$. In order to calculate the number of volts necessary to actuate the individual tips 11 of the conductor 7 the voltage pull-in ($V_{PI}$), equations may be used.

For example, the pull-in volts $V_{PI}$ pull-in can be calculated as follows:

$$V_{PI} = 100 \frac{(d \text{ in } \mu)^3 (\delta_O \text{ in } \mu)^3}{(L \text{ in mils})^4}$$

$$f_R = 0.16 \frac{d}{L^2} \; \frac{Y}{\delta} \text{ sec}^{-1}$$

$$\delta_g = \frac{0.384}{(f_R)^2 \, (\text{KH}_z)^2 \, \mu\text{G}}$$

where:

$Y \sim 10^{11}$ N/m$^2$ (Gold)

$Y/\delta \sim 2.0 \times 10^3$ meters/sec (gold), and $f_R$, mechanical resonant frequency of the conductor beam.

FIG. 5 is a schematic representation of the preferred embodiment of an array 40 of electrostatic switches 2, in a photodriven application. A source 30 of visible light, operable to emit photons of energy 31 is positioned before a shadow mask 33. The shadow mask 33 has orifices 35 cut within it operable to define the visible light 31 passing through the orifices 35. The shadow mask 33 allows only a predetermined portion of the visible light 30 to pass through the mask 33 to the lens 38. This lens 38 is then operable to project the shadow mask defined light 31 onto an array 40 of electrostatic switches 2 as optical pattern 42. The electrostatic switches 2 more clearly shown in FIG. 4, form a mesh 41. These electrostatic switches 2 will be selectively activated into a "closed" position in those light exposed regions 43 of the optical pattern 42 which receives the photons of visible light 31 from the lens 38. The use of photodriven switches 2 in an array 40 for the protection of a radar operating at narrow frequencies has now been expanded by using a grid-shaped mask 33 to project a large grid pattern and can now selectively actuate switches 2 thereby forming a larger, broader frequency grid upon the array 40. The electrostatic switch 2 as shown more clearly individually in FIG. 2 would be of a size of approximately 1/10 of an inch, further comprising an embodiment having a ground plane transparent to visible energy 31 such as, for an example $InSnO_3$ (indium tin oxide). This transparent substrate would permit rear projection of the light pattern from the shadow mask 33 from within the airplane, thereby actuating selectively rows of switches 2 upon the skin of the aircraft and making a wide frequency range array.

Figure 6:
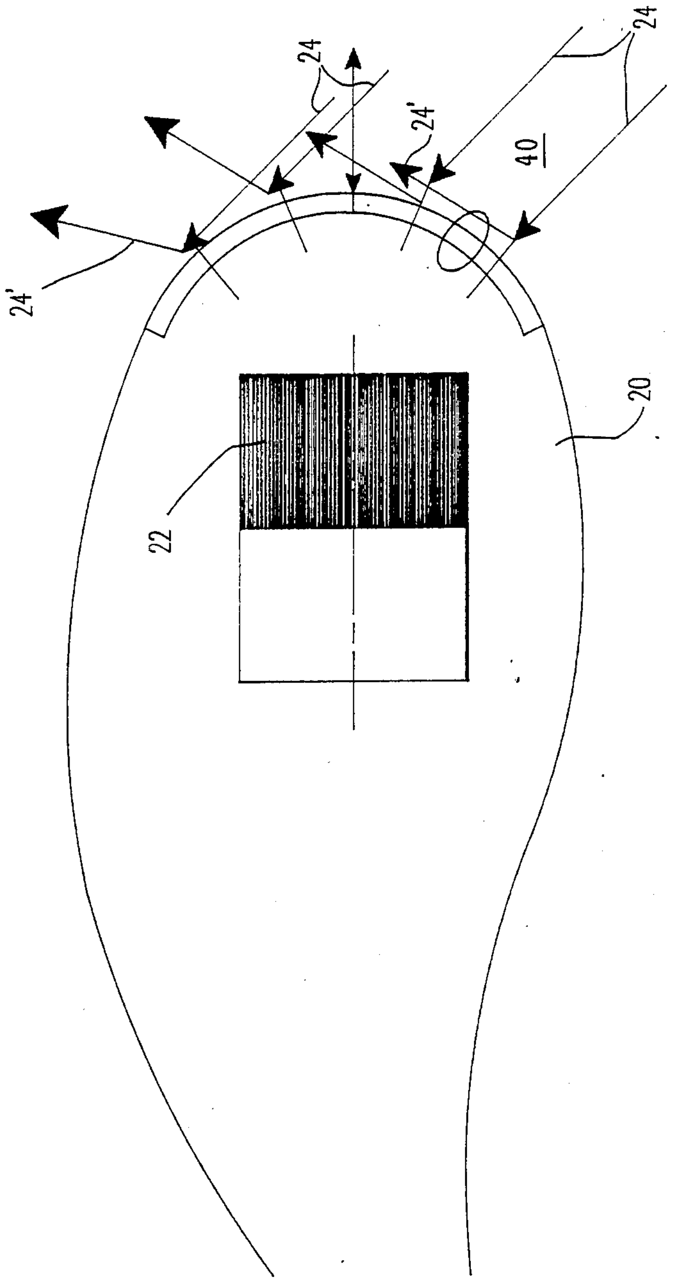
FIG. 6 is a plan view of an array of electrostatic switches in use in a smooth wing configuration for an electronic warfare array.

FIG. 6 shows using a schematic representation of the use of a shutter in a smooth wing configuration such as a cross-sectional view of an airplane wing, operable to maintain low radar cross-section while the shutter is in the OFF position. The shutter array 40 is shown, as one example mounted conformally into the curvature of the airplane wing 20 directly protecting the radar or electronic warfare array 22. When in flight, the airplane wing 20 carrying the radar electronic warfare array 22 would be subjected to incoming waves of RF energy 24 from outside radio frequency energy sources "searching" for the radar. When the shutter array 40 is in the off position, the incoming waves of RF energy 24 which strike the conformal surface of the airplane wing 20 from below would be deflected as reflected RF energy 24'. There would be very little scattering downward into outerspace of the reflected RF energy waves 24'. It can be shown as in FIG. 6 that the total energy to activate a 6000 electrostatic switch element, 100 volt shutter array 40 is only approximately 10 microjoules, making the switching energy required for a 0.1 meter square window of approximately 6,400,000 switches only be 0.01 joule. With a window frequency in the kilohertz range, only about 10 watts of power would be necessary to power the shutter array 40, and this power value could easily be reduced by a factor of 10 with judicious geometry of the switches and biasing of the individual electrostatic switches 2.

Additionally, it should be noted that during the ON time of the shutter, as shown in FIG. 6, no power would be necessary to keep the inherently infinite impedance electrostatic switches 2 closed in direct contrast to the utilization of a PIN diode.

As can be seen in the previous drawings, specifically FIG. 4, FIG. 5 and FIG. 6, the RF, metallic mesh, high speed, broadband shutter array 40 is operable to protect; using batch high yield fabricated electrostatic switches 2 on a single shutter array 40, electronic warfare or radar devices 22. The electrostatic switches 2 which interconnect the conductive beam members would be fully functional requiring extremely low power during the RF broadband spectrum and the multiplicity of lower power switches in approximately 10 watts per multisquare foot would allow a fast switching time in the area of approximately 10 microseconds. This would be ideal for the protection of RF energy emitters 22 from detection, in particular, in high active warfare situations.

New variations may be made in the above described combination and in different embodiments of this invention. They may be made without departing from the spirit thereof. Therefore, it is intended that all matter contained in the foregoing description and the accompanying drawing shall be interpreted as illustrative and thus not in a limiting sense.

What is claimed is:

1. A high attenuation, broad band, high speed radio frequency shutter, comprising:

a multiplicity of electrostatic switches said switches operable to be actuated by a predetermined voltage into a closed position, said switches further operable to allow the passage of a radio frequency signal, striking said switches;

a switch support means, said electrostatic switches spaced a predetermined distance from each other upon a surface of said switch support means said predetermined distance being less than the shortest wavelength of said radio frequency signal, where said radio frequency strikes said switch support means, said radio frequency signal being alternately blocked by said closed switches and passed through said open switches; and a multiplicity of conductive beam members mounted upon said surface of said switch support means, said conductive beam members positioned upon said surface of said switch support means at right angles to each other, said conductive beam members interconnecting said switches.

2. A high attenuation, broadband high speed radio frequency shutter as in claim 1, wherein said switch support means further comprises an insulating substrate.

3. A method of radar protection utilizing a high attenuation, broadband, high speed radio frequency shutter, which method comprises:

providing a multiplicity of electrostatic switches, said switches interconnected by conductive beam members, said switches operable to be actuated by a predetermined voltage into a closed position; and energizing said switches into said closed position thereby blocking a radio frequency signal;

deenergizing said switches into an open position thereby transmitting said radio frequency signal;

providing a switch support means, said electrostatic switches spaced upon a surface of said switch support means at a predetermined distance between said electrostatic switches, said distance between said electrostatic switches being less than the shortest wavelength of said radio frequency signal which is alternately transmitted or blocked by said shutter.

4. An electrostatic switch, comprising:

a first insulating substrate layer;

a first high resistivity conductive layer, said first high resistivity conductive layer deposited upon said first insulating substrate layer;

a first support layer, said first support layer deposited upon said first high resistivity conductive layer;

a first highly conductive patterned layer, said first highly conductive layer deposited upon said first support layer;

a multiplicity of photolithographically displaced regions having a circular configuration, said multiplicity of photolithographically displaced regions positioned predetermined distance apart from each other;

a multiplicity of planar, linear conductive members, said planar, linear conductive members intersecting at right angles upon said second, resistivity conductive layer; and a multiplicity of electrical contact means positioned within said photolithographically displaced regions, said electrical contact means operable to pull into contact said planar; linear conductive members.

5. A high attenuation, broadband, high speed radio frequency shutter, comprising:

an insulating substrate;

a first high resistivity layer, said first high resistivity layer deposited upon said insulating substrate;

a first insulating layer deposited upon said first high resistivity layer;

a multiplicity of circular metal contacts, said circular metal contacts spaced a predetermined distance apart upon said first insulating layer;

a second high resistivity layer deposited upon said first insulating layer;

a multiplicity of highly conductive strips deposited upon said second high resistivity layer, said highly conductive strips intersecting at right angles upon said second high resistivity layer; and a multiplicity of circular, photolithographically inscribed regions surrounding said multiplicity of circular metal contacts, said inscribed regions, being directly beneath portions of said multiplicity of highly conductive strips, such that said strips form cantilever arms over said contact and inscribed regions, said cantilevered arms being operable to be electrostatically pulled toward said contacts during said radio frequency shutter operation.

6. A radar protection system, comprising:

a radio frequency transmitting and receiving means mounted behind a conformal surface; and a high attenuation, broadband, high speed, radio frequency shutter, said high attenuation, broadband, high speed, radio frequency shutter mounted upon said conformal surface directly over said radio frequency transmitting and receiving means, said high attenuation, broadband, high speed, radio frequency shutter further comprising a multiplicity of electrostatic switches positioned upon said conformal surface a predetermined distance apart, said electrostatic switches operable to be interconnected by conductive beam members, said distance being less than the shortest wavelength of a radio frequency signal emitted or received by said radio frequency transmitting and receiving means.

* * * * *